Figure 1:
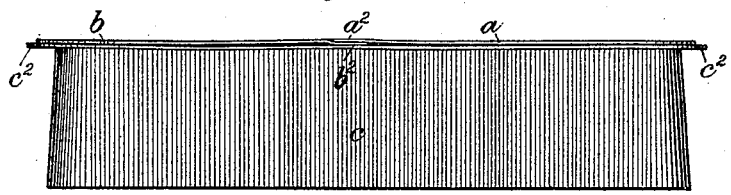

(No Model.) 7 Sheets—Sheet 1.

G. H. WILLIAMSON.
METALLIC BOX.

No. 581,189. Patented Apr. 20, 1897.

Witnesses:—
Richard Skerrett
Arthur John Powell

Inventor:—
George Henry Williamson (No Model.) 7 Sheets—Sheet 2.

G. H. WILLIAMSON.
METALLIC BOX.

No. 581,189. Patented Apr. 20, 1897.

Witnesses:—
Richard Skerrett
Arthur John Powell

Inventor:—
George Henry Williamson (No Model.)  
7 Sheets—Sheet 3.
G. H. WILLIAMSON.
METALLIC BOX.
No. 581,189.  
Patented Apr. 20, 1897.
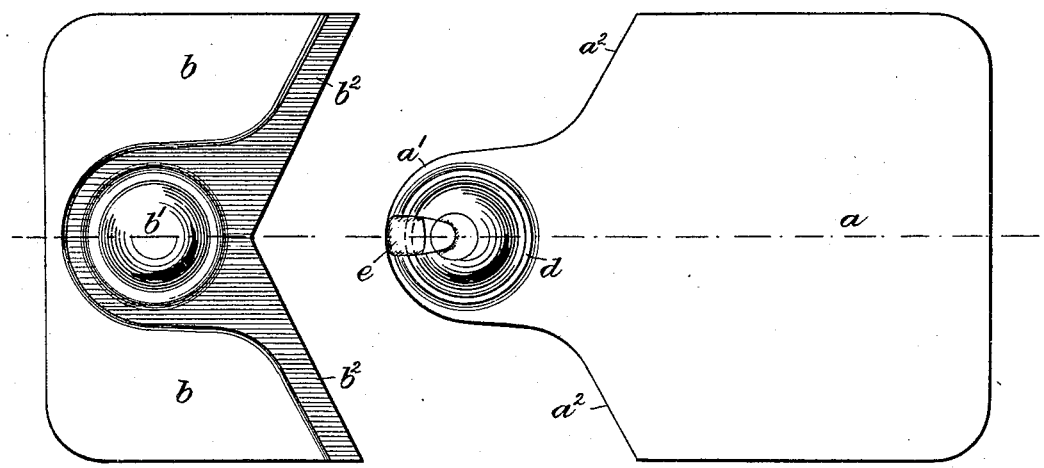
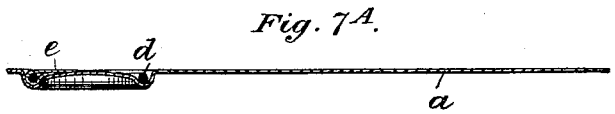
Witnesses:—
Richard Skerrett
Arthur John Powell
Inventor:—
George Henry Williamson (No Model.)
7 Sheets—Sheet 4.
G. H. WILLIAMSON.
METALLIC BOX.
No. 581,189.                   Patented Apr. 20, 1897.
Fig. 8.
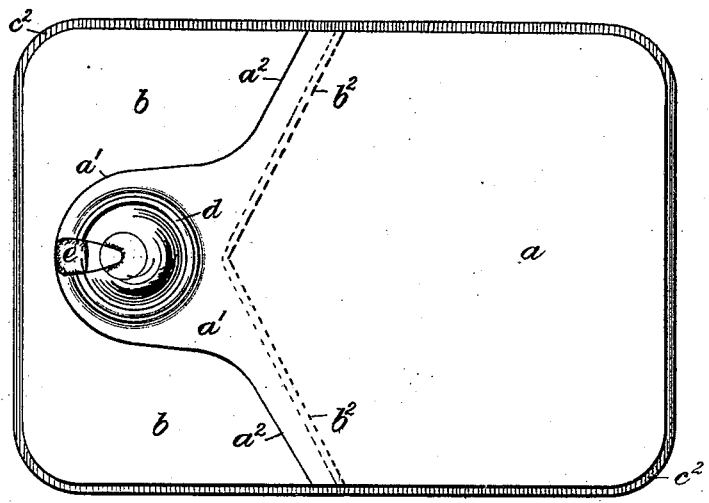
Fig. 9.
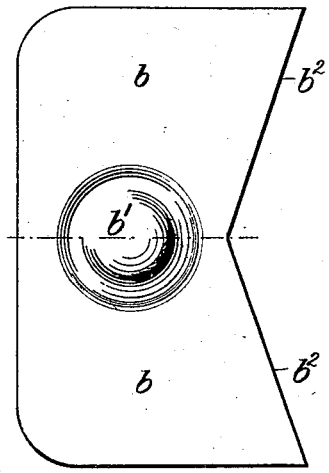
Fig. 10.
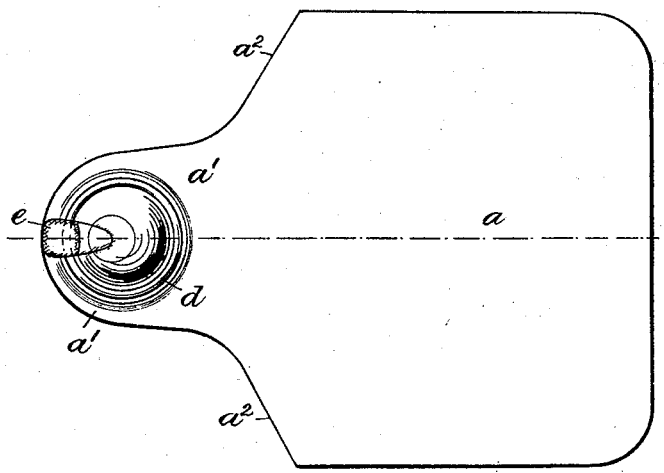
Fig. 9ᴬ.
Fig. 10ᴬ.
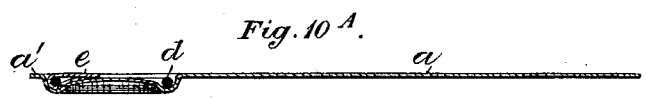
Witnesses:—
Richard Skerrett.
Arthur John Powell.
Inventor:—
George Henry Williamson (No Model.) 7 Sheets—Sheet 5.

G. H. WILLIAMSON.
METALLIC BOX.

No. 581,189. Patented Apr. 20, 1897.

Witnesses:—
Richard Skerrett
Arthur John Powell

Inventor:—
George Henry Williamson (No Model.) 7 Sheets—Sheet 6.

G. H. WILLIAMSON.
METALLIC BOX.

No. 581,189. Patented Apr. 20, 1897.

Witnesses:-
Richard Skerrett
Arthur John Powell

Inventor:-
George Henry Williamson (No Model.)  7 Sheets—Sheet 7.

G. H. WILLIAMSON.
METALLIC BOX.

No. 581,189. Patented Apr. 20, 1897.

Witnesses:—
Richard Skerrett
Arthur John Powell

Inventor:—
George Henry Williamson

UNITED STATES PATENT OFFICE.

GEORGE HENRY WILLIAMSON, OF WORCESTER, ENGLAND.

METALLIC BOX.

SPECIFICATION forming part of Letters Patent No. 581,189, dated April 20, 1897.

Application filed November 10, 1896. Serial No. 611,630. (No model.)

*To all whom it may concern:*

Be it known that I, GEORGE HENRY WILLIAMSON, a subject of the Queen of Great Britain, residing at the city of Worcester, England, have invented certain new and useful improvements in metallic boxes or tins for storing tobacco, cigarettes, snuff, and articles of food and for other like purposes; and I do hereby declare that the following is a full, clear, and exact description of the invention, which will enable others skilled in the art to which it appertains to make and use the same.

My invention has reference principally to square, oval, or oblong hermetically-sealed metallic boxes or tins for storing tobacco, cigarettes, snuff, articles of food, and the like, the said boxes or tins being provided with tear-off lids of the kind hereinafter described, the object of my invention being to facilitate the tearing off of the lid for opening the box or tin without the use of a knife or tool.

The lid to which my invention applies is made in two parts, one part covering the box or tin at one end and being permanently soldered thereto and the other part, consisting of the tear-off part, covering the remainder of the top of the box or tin. The sides and one end of this tear-off part of the lid are soldered to the horizontal flange at the mouth of the box or tin, while the other end of the said part overlaps and is lightly soldered to the inner end of the permanently-attached part of the lid. The last-described soldering is effected before the whole lid is soldered to the box. The lightly-soldered end of the tear-off part is provided with a loose or unsoldered tongue-piece or finger-plate by the lifting of which the required hold is obtained upon the said part for tearing it from the permanently-attached part of the lid and from the box or tin.

According to my invention I construct the loose or unsoldered tongue-piece of the tear-off part of the lid of a square or rectangular box or tin and the permanently-attached part of the said lid in the manner hereinafter described, whereby the tearing off of the tear-off part for opening the box is facilitated and the loose tongue-piece, with ring attached, made to lie flush with the said permanently-attached part of the lid.

The loose tongue-piece which I prefer to use has parallel sides and a semicircular end, and in the said tongue-piece I make a shallow circular recess or depression, into which I fit a wire ring, the said ring being so connected or jointed to the said recess that it is capable of being turned down into or raised out of the said recess. In the permanently-fixed part of the lid I make a circular recess corresponding to that in the tongue-piece of the tear-off part, so that the recess holding the wire ring can fit into that in the fixed part of the lid, and I also make in the fixed part of the lid and external to the circular recess therein a shallow depression of a figure proper for the whole of the tongue-piece to take into it, so that the latter when in its normal position lies flush with the fixed part of the lid, the ring-carrying recess in the tongue-piece passing into the corresponding recess in the fixed part. The loose or lifting part of the tear-off part is thus made flush with the other part of the lid, and as the wire ring lies in the recess in the said loose part the whole of the lid is practically without projecting parts.

In order to tear off the detachable part of the lid, the ring is raised out of its recess, so that the finger can be introduced into it and the tongue-piece raised from the fixed part of the lid. By the firm hold which the hand is thus able to take upon the loose end of the detachable or tear-off part by means of the ring the tearing off of the said part is very readily effected.

My invention may be applied to oval, circular, or other-shaped boxes or tins, as well as to square or oblong metallic boxes or tins.

Figure 2:
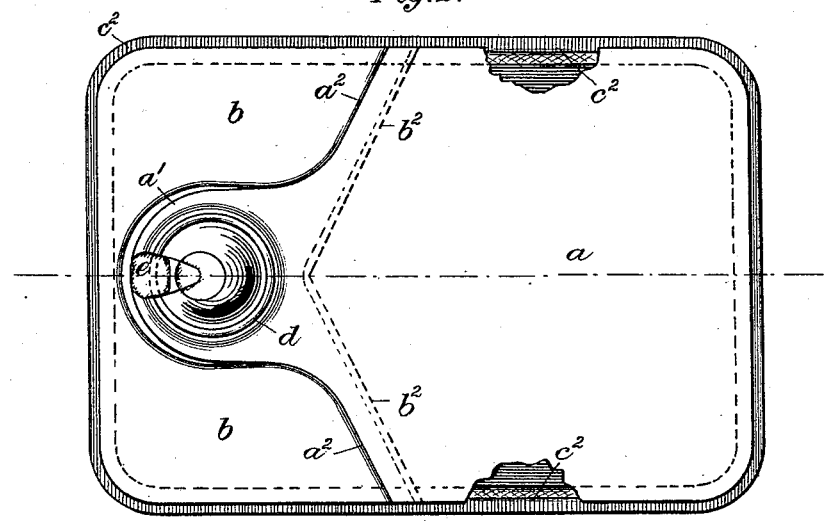
Figure 3:
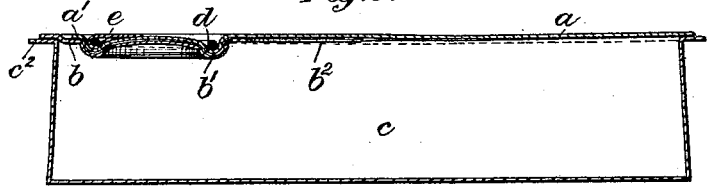
Figure 4:
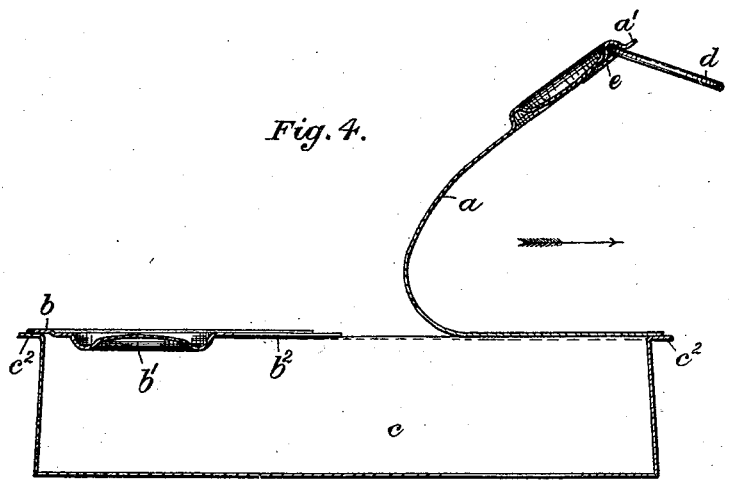
Figure 5:
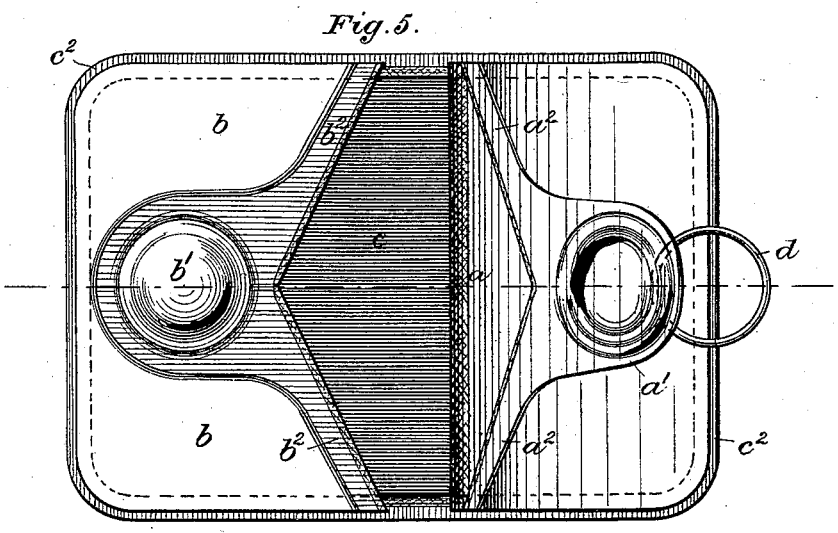

Figure 1 of the accompanying drawings represents in side elevation, Fig. 2 in plan, with parts of the lid broken away, and Fig. 3 in longitudinal section, a shallow hermetically-sealed box containing my improvements, the said box being of the kind commonly employed in the packing of sardines. Figs. 4 and 5 represent, respectively, in longitudinal section and plan the said box in the act of being opened. Fig. 6 represents in plan, and Fig. 6$^A$ in longitudinal section, the permanently-fixed part of the lid of the box; and Fig. 7 represents in plan, and Fig. 7$^A$ in longitudinal section, the tear-off part of the lid of the box. Fig. 8 represents in plan a similar box to that represented in Figs. 1 to 5, both inclusive, with a modified lid. Figs. 9, 9ᴬ, 10, and 10ᴬ represent the parts of the modified lid of the box separately. Figs. 11, 12, 13, 14, 15, 16, 17, and 18 represent other forms of metallic boxes provided with my improvements.

The same letters of reference indicate the same parts in the several figures of the drawings.

In constructing the lid of a box according to my invention I make the loose or unsoldered tongue-piece $a'$ of the tear-off part $a$ of the lid preferably of a semicircular figure and with a circular depression for receiving a ring $d$, by which a firm hold on the tear-off part $a$ is obtained for the finger in stripping the said tear-off part $a$ of the lid from off the box. The said ring $d$ is permanently secured in the circular depression or recess by the soldered lip-piece $e$, the said lip-piece constituting a joint in which the ring $b$ turns when raised, as represented in Figs. 4 and 5, for tearing off the tear-off part $a$ of the lid. I make the permanently-fixed part $b$ of the lid with a similar depression $b'$ and with sunken edges $b^2 b^2$, the said sunken depression and edges being of a size and depth suitable to receive the loose tongue-piece $a'$ and edges $a^2 a^2$ of the tear-off part $a$ of the lid, so that when the two parts of the lid are soldered together at their edges $a^2 b^2$ the top of the one part is flush with the top of the other part.

The permanently-fixed part $b$ of the lid and the tear-off part $a$ are secured together by soldering the edges $b^2 b^2$ of the permanently-fixed part to the under side of the tear-off part $a$ before the lid is applied to the box $c$. After the box $c$ has been filled the edges of the lid, which is now practically in one piece, are secured to the horizontal flange $c^2$ of the box $c$ by soldering.

When it is desired to open the box to get at the contents of the same, it is only necessary to raise the ring $d$ and to pull back the loose tongue-piece $a'$, as illustrated in Figs. 4 and 5, when the tear-off part of the lid is easily stripped from off the box $c$.

In Figs. 8, 9, 9ᴬ, 10, and 10ᴬ the permanently-attached part $b$ of the lid of the box $c$ is provided with a circular depression or recess $b'$ only for receiving the ring recess or depression of the tear-off part $a$ of the lid. It will be understood that in this arrangement the edges $a^2 a^2$ and tongue-piece $a'$ of the tear-off part $a$ of the lid are not flush with the top of the permanently-attached part $b$ of the said lid.

Figure 11:
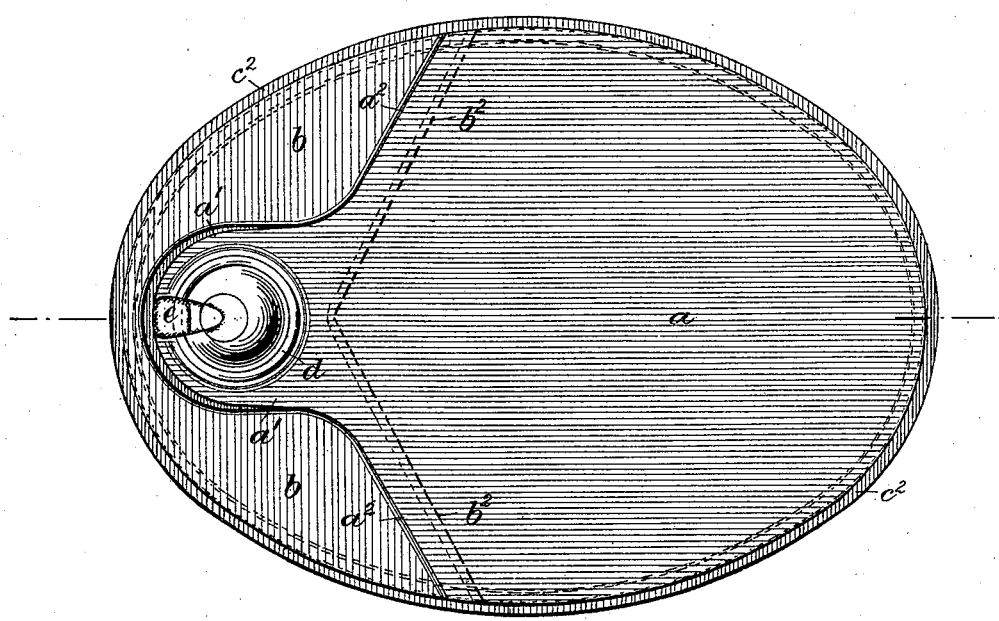
Figure 12:
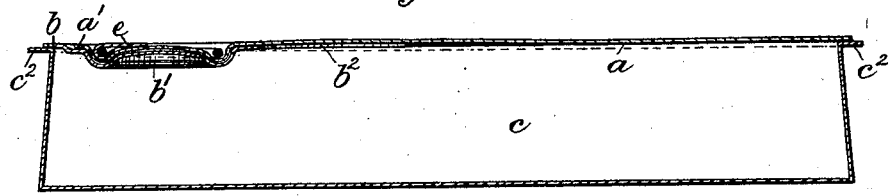

Figs. 11 and 12 represent the improvements described with respect to the box Figs. 1, 2, 3, 4, and 5 applied to an oval-shaped box.

Figure 13:
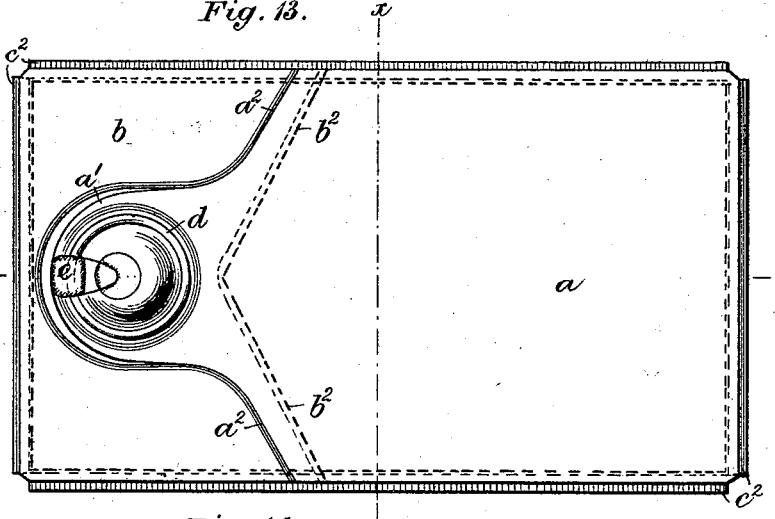
Figure 14:
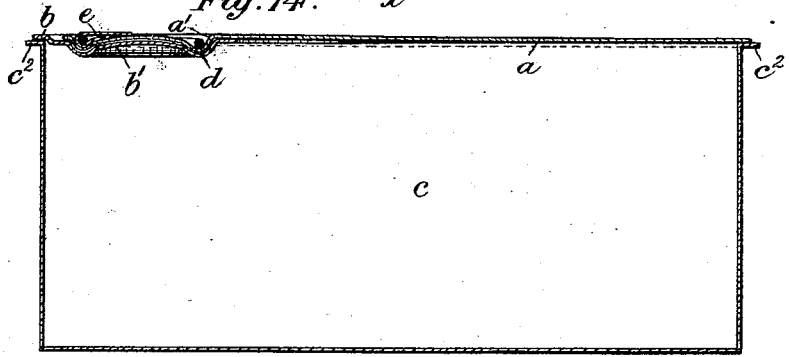
Figure 15:
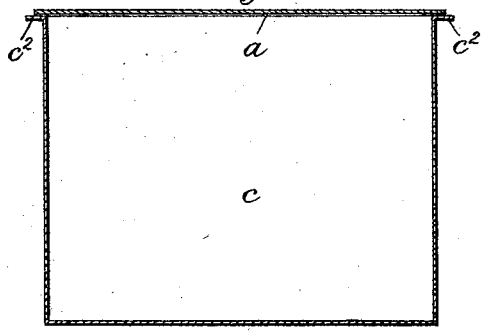

Figs. 13, 14, and 15 represent the improvements first described applied to an oblong box of greater depth than those hereinbefore represented. Fig. 15 is a cross-section on the dotted line $x$ $x$, Fig. 13.

Figure 16:
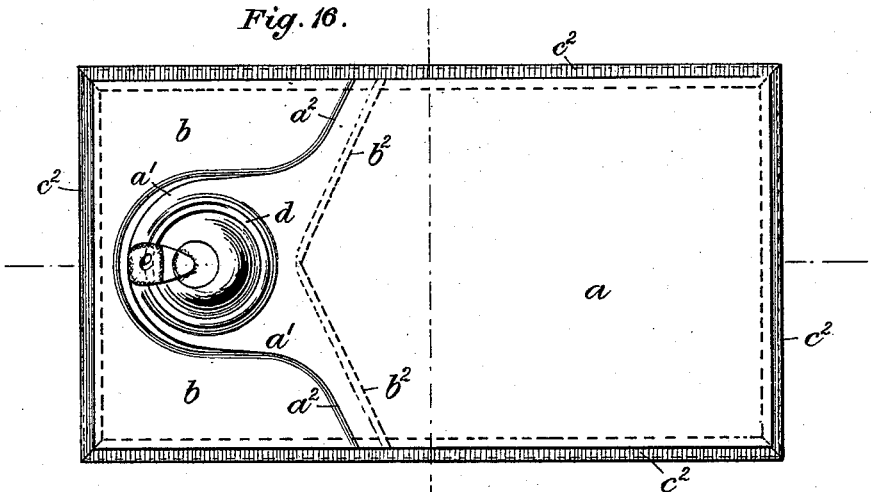
Figure 17:
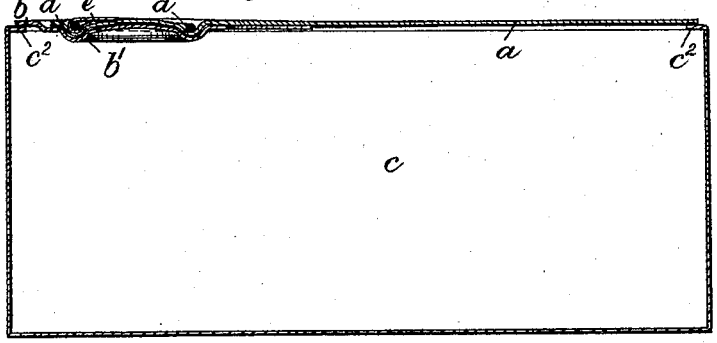
Figure 18:
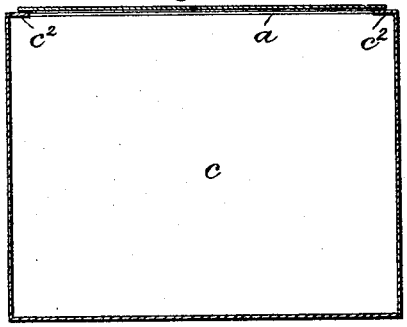

Instead of turning the edges of the boxes hereinbefore described outward, so as to form the horizontal flange $c^2$ for receiving the edges of the lid, the said horizontal flange $c^2$ may be formed by turning the edges $a^2$ inward, as represented in Figs. 16, 17, and 18.

Having now particularly described and ascertained the nature of my invention and in what manner the same is to be performed, I declare that I claim—

1. A hermetically-sealed box having a sectional lid or cover composed of a permanent and a tear-off section, the permanent section secured in position and having a sunken seat and a depressed or sunken edge portion, and the tear-off section lightly soldered in said depressed or sunken edge portion flush with the surface of the permanent section and provided with a loose tongue-piece adapted to lie in said sunken seat of the permanent section, substantially as shown and described.

2. A hermetically-sealed box or tin for storing tobacco, cigarettes, snuff, and articles of food and for other like purposes having a tear-off lid or cover the loose or unsoldered tongue-piece of which has a lifting-ring and a circular recess or depression for the same the recess or depression in the tongue-piece fitting in a corresponding recess or depression in the permanently-attached part of the cover substantially as described and set forth.

GEORGE HENRY WILLIAMSON. [L. S.]

Witnesses:
RICHARD SKERRETT,
ARTHUR JOHN POWELL.